No. 636,447. Patented Nov. 7, 1899.
W. W. PADDOCK.
PRESSURE FILTER.
(Application filed July 3, 1899.)
(No Model.)
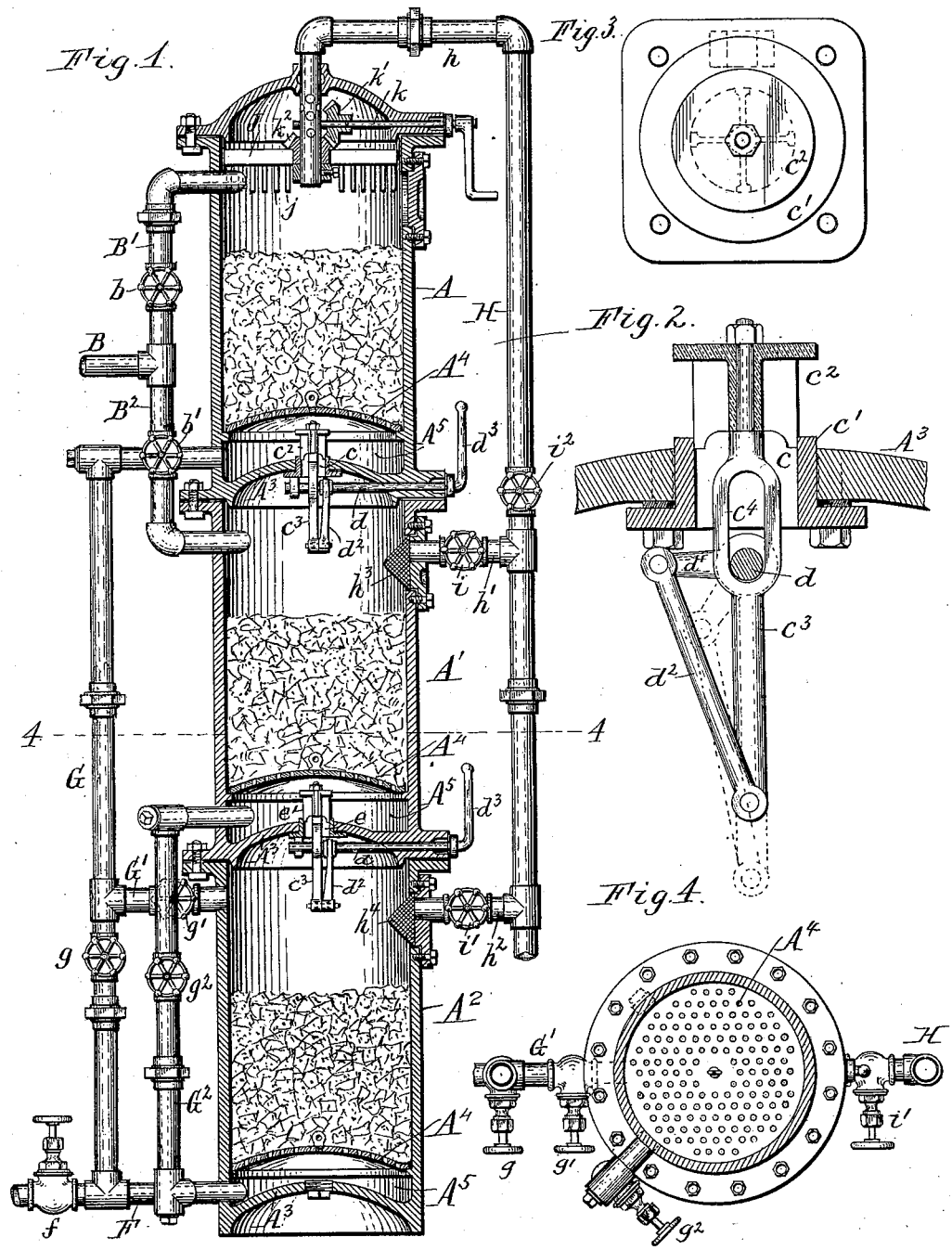

UNITED STATES PATENT OFFICE.

WILLIAM W. PADDOCK, OF BUFFALO, NEW YORK.

PRESSURE-FILTER.

SPECIFICATION forming part of Letters Patent No. 636,447, dated November 7, 1899.

Application filed July 3, 1899. Serial No. 722,620. (No model.)

*To all whom it may concern:*

Be it known that I, WILLIAM W. PADDOCK, a citizen of the United States, residing at Buffalo, in the county of Erie and State of New York, have invented new and useful Improvements in Pressure-Filters, of which the following is a specification.

This invention relates to pressure-filters which comprise a number of superposed compartments or sections, each containing a bed of filtering material through which the liquid percolates for purifying the same.

The principal object of my invention is to so organize the filter that any one of its compartments can be conveniently and independently cleansed with pure water, which is obtained by filtering the same through the beds of the other compartments before directing it through the compartment to be cleansed.

The invention has the further object to provide the outlets of the compartments with efficient valves which can be conveniently manipulated and reliably closed.

In the accompanying drawings, Figure 1 is a sectional elevation of my improved filter. Fig. 2 is an enlarged vertical section of one of the outlet-valves of the upper compartments and its operating devices, the plane of the section being at right angles to Fig. 1. Fig. 3 is a detached top plan view, on an enlarged scale, of said valve and the bushing in which the same is arranged. Fig. 4 is a horizontal section in line 4 4, Fig. 1.

Like letters of reference refer to like parts in the several figures.

The filter preferably comprises three cylindrical compartments or sections A A' A², each of which contains a bed of suitable filtering material, which is not shown in the drawings. Any suitable or well-known granular substances may be employed for this purpose, and the filtering-beds are graduated as to fineness from the upper to the lower compartment in a common manner. Each compartment is provided with an imperforate bottom A³ and at a short distance above the same with a strainer or perforated diaphragm A⁴, the space between the bottom and the diaphragm forming a pure-water chamber A⁵. The several sections are secured together by vertical bolts, which pass through flanges projecting from the adjoining ends of the sections, and the bottoms of the two upper sections form the closed upper ends of the sections immediately below the same.

B is the main inlet-pipe for the unfiltered water, and B' B² are branch pipes leading from said pipe to the upper portion of the upper and the intermediate compartments A A', respectively, and provided with hand-valves $b$ $b'$. The pure-water chamber A⁵ of the upper compartment communicates with the main chamber of the central compartment by a passage $c$, formed in the bottom of the upper compartment and preferably provided with a bushing $c'$, and the flow of the water through this passage is controlled by a suitable valve $c^2$, preferably a vertically-sliding disk valve which seats against the upper end of the bushing $c'$. The stem $c^3$ of this valve extends downwardly through the passage $c$, and the valve is operated from a transverse rock-shaft $d$ by a crank-arm $d'$, secured to the shaft and connected with the lower end of the valve-stem by a link $d^2$, so that upon turning the shaft in one or the other direction the valve is opened or closed. The rock-shaft $d$ is supported in a bearing arranged at the bottom of the upper compartment and is provided at its projecting outer end with an arm $d^3$ for turning it. The valve-stem is provided with a vertical slot or loop $c^4$ for the passage of the rock-shaft, whereby the shaft clears the stem and in conjunction with the loop forms a guide for the stem.

The lower compartment A² communicates with the pure-water chamber A⁵ of the central filtering-compartment by a passage $e$, similar to the passage $c$, and said passage is controlled by a valve $e'$, similar to the valve $c^2$.

F is the outlet-pipe for the filtered water, which leads from the pure-water chamber A⁵ of the lower compartment A² and which is provided with a hand-valve $f$.

G is a by-pass or pipe leading from the outlet-pipe F to the pure-water chamber A⁵ of the upper compartment A. This by-pass is provided with a valve $g$. G' is a similar by-pass leading from the portion of the by-pass G between its valve $g$ and the upper end thereof to the upper portion of the lower compartment A² and having a valve $g'$. G² is a similar by-pass or pipe which connects the pure-water chamber of the central compartment A' with the corresponding chamber of the lower compartment A² and which has a hand-valve $g^2$.

H is a main cleaner or waste pipe which is connected with the upper portions of the three filtering-compartments A A' A² by branch pipes $h$ $h'$ $h^2$, respectively. The branch pipes $h'$ $h^2$ of the central and lower compartments are provided with hand-valves $i$ $i'$, and the main cleaner-pipe is provided between the upper and central branch pipes $h$ $h'$ with a similar valve $i^2$.

$h^3$ $h^4$ represent strainers, preferably of conical form, which are applied to the inner ends of the cleaner branches $h'$ $h^2$ for preventing the filtering material from being washed into the cleaner-pipe in cleansing the filter.

J is a rotary stirring device arranged in the upper portion of the upper compartment and adapted to break up the film of impurities formed on the surface of the upper filter-bed. This stirrer consists of a horizontal spider or disk provided with depending pins or fingers $j$, which penetrate and rupture said film. This disk is journaled upon the adjacent vertical portion of the cleaner-pipe H and is turned by means of a horizontal shaft $k$, having a bevel-gear $k'$, which meshes with a similar gear $k^2$, secured to the hub of the stirrer. This shaft is supported in the upper compartment A and provided at its outer end with a hand-crank for turning it.

The operation of my improved filter is as follows: In filtering the liquid through the several compartments the valve $b$ of the inlet branch B' and the sliding valves $c^2$ and $e'$, arranged in the bottom of the upper and central compartments A A', are opened and all of the remaining valves—viz., the valves $b'$, $g$, $g'$, $g^2$, $i$, $i'$, and $i^2$—are closed. The unfiltered liquid entering the upper compartment through the branch B' percolates through the bed of the upper compartment, enters the pure-water chamber A⁵ of said compartment, and passes thence through the passage $c$ into the central compartment, after which it descends through the filter-beds and pure-water chambers of the central and lower compartments in the same manner, the filtered water finally collecting in the pure-water chamber of the lower compartment A², from which it is drawn through the outlet-pipe F by opening the valve $f$.

When it is desired to clean the upper filtering-compartment A, the valve $b'$ of the lower inlet branch B², the valve $e'$ in the bottom of the central filtering-compartment, the valve $g$ of the by-pass G, and the valve $i^2$ of the main cleaner-pipe H are opened, and all of the remaining valves—viz., the valve $b$, $c^2$, $f$, $g'$, $g^2$, $i$, and $i'$—are closed. The unfiltered water is now shut off from the upper compartment and enters the central compartment A' through the inlet branch B², percolates through the bed of filtering material in said compartment and into the pure-water chamber A⁵ thereof, passes thence through the open passage $e$ into and through the lower filtering-compartment and its pure-water chamber, thence through the outlet-pipe F and by-pass or pipe G into the pure-water chamber of the upper compartment, and thence upwardly through the bed of filtering material therein, whence the water charged with the detached impurities of said bed escapes through the cleaning-pipe H into the sewer. The upper compartment is thus cleaned by water which is first filtered through the central and lower compartments A' A² and then directed through the bed of the upper compartment in the reverse direction to that in which the liquid ordinarily passes through the filter, whereby the bed is thoroughly cleaned.

In order to cleanse the central or intermediate compartment A', the valve $b$ of the upper inlet branch B', the valve $g'$ of the by-pass G', the valve $g^2$ of the by-pass G², and the valve $i$ of the cleaning branch $h'$ are opened and all of the remaining valves—viz., the valves $b'$, $c^2$, $e'$, $f$, $g$, $i'$, and $i^2$—are closed. The unfiltered water being now shut off from the central compartment A' enters the upper compartment A through the inlet branch B', passes downwardly through its filtering-bed and pure-water chamber A⁵, thence through the upper section of the by-pass G and the branch by-pass G' into the lower compartment A², thence downwardly through the filtering-bed and the pure-water chamber of the latter compartment, thence through the by-pass G² into the pure-water chamber of the central compartment, thence upwardly through the filtering-bed of this compartment, and finally through the branch $h'$ into the cleaner-pipe H, whereby the cleaning-water is filtered through the upper and lower compartments before passing upwardly through the filtering-bed of the central compartment.

When it is desired to clean the lower compartment, the valve $b$ of the upper inlet branch B', the sliding valve $c^2$ in the bottom of the upper compartment, the valve $g^2$ of the by-pass G², and the valve $i'$ of the cleaning branch $h^2$ are opened and the remaining valves—viz., the valves $b'$, $e'$, $f$, $g$, $g'$, $i$, and $i^2$—are closed. The unfiltered water, which is now shut off from the lower compartment, enters the upper compartment through the upper inlet branch B', percolates through the bed thereof, passes thence through the pure-water chamber of said compartment and the passage $c$ into the central compartment, thence through the bed of the latter into the corresponding pure-water chamber, thence downwardly through the by-pass G² into the pure-water chamber of the lower compartment, thence upwardly through the filter-bed of this compartment, and finally through the branch pipe $i'$ into the cleaner-pipe H.

It will thus be observed that the connections and valves of the several filtering-compartments are so arranged that each compartment can be isolated and independently cleaned by filtered water which is passed through the filtering-beds of the other compartments before being directed through the compartment to be cleansed.

I claim as my invention—

1. The combination with the upper, lower and intermediate filtering compartments connected by passages which are controlled by cut-off valves, of a main inlet-pipe, valved branch pipes leading from said main pipe to the upper portion of the upper and intermediate compartments, valved by-passes leading from the lower portion of the upper compartment to the upper and lower portions of the lower compartment, a valved by-pass connecting the lower portions of the intermediate and lower compartments, and a cleaner or waste pipe connected with the upper portion of the several compartments, substantially as set forth.

2. The combination with the upper, lower and intermediate filtering compartments connected by passages which are controlled by cut-off valves, each of said compartments being provided in its bottom with a pure-water chamber, of a main inlet-pipe, valved branch pipes leading from said main pipe to the upper portions of the upper and central compartments, valved by-passes leading from the pure-water chamber of the upper compartment to the lower compartment and its pure-water chamber respectively, a valved by-pass connecting the pure-water chambers of the central and lower compartments, and a cleaner or waste pipe having branches connected with the upper portions of the upper, central and lower compartments, respectively, substantially as set forth.

3. The combination with the upper, lower and intermediate filtering compartments connected by passages which are controlled by cut-off valves, each of said compartments being provided in its bottom with a pure-water chamber, of a main inlet-pipe, valved branch pipes leading from said main pipe to the upper portions of the upper and central compartments, a discharge-pipe connected with the pure-water chamber of the lower compartment, a valved by-pass leading from the pure-water chamber of the upper compartment to said discharge-pipe, a second valved by-pass connecting the upper portion of the lower compartment with the first-named by-pass, a third valved by-pass connecting the pure-water chambers of the intermediate and lower compartments, and a cleaner or waste pipe having branches connected with the upper portions of the several compartments, respectively, substantially as set forth.

4. The combination with two superposed filtering-compartments, the bottom of the upper compartment forming the top of the lower compartment and having a passage which connects the compartments, of a vertically-movable valve arranged in said passage, an actuating device extending from said valve through the side of the compartment, and a perforated diaphragm arranged across the lower portion of the upper compartment above the bottom thereof and supporting the filtering material in the same, substantially as set forth.

5. The combination with two superposed filtering-compartments, the bottom of the upper compartment forming the top of the lower compartment and having a passage which connects the compartments, of a vertically-movable valve arranged in said passage, an actuating rock-shaft extending outwardly through a journal-box in the outer portion of said bottom, and means whereby the inner portion of said shaft is connected with said valve, substantially as set forth.

6. The combination with a pair of superposed filtering compartments or sections, the bottom of the upper section forming the top of the lower section and having a passage which connects the two sections, of a vertically-movable valve applied to said passage and having a stem which extends downwardly below said passage, a horizontal rock-shaft arranged below said valve and having a crank-arm, and a link connecting said valve-stem with said crank-arm, substantially as set forth.

7. The combination with a pair of superposed filtering compartments or sections, the bottom of the upper section forming the top of the lower section and having a passage which connects the two sections, of a vertically-movable valve applied to said passage and having a stem extending downwardly below said passage and having a vertical slot or loop, a horizontal rock-shaft passing through said slot or loop and having a crank-arm and a link connecting the lower end of said valve-stem with said crank-arm, substantially as set forth.

Witness my hand this 24th day of June, 1899.

WILLIAM W. PADDOCK.

Witnesses:
JNO. J. BONNER,
GRACE E. GODFREY.